(12) United States Patent
Manfredotti et al.

(10) Patent No.: US 8,226,364 B2
(45) Date of Patent: Jul. 24, 2012

(54) BLADE PROVIDED WITH A RESONATOR TO REDUCE THE DRAG MOVEMENTS OF SAID BLADE, AND A METHOD IMPLEMENTED BY SAID BLADE

(75) Inventors: Thomas Manfredotti, La Colle sur Loup (FR); Paul Cranga, Marseille (FR); Julien Guitton, Chateauneuf-les-Martigues (FR)

(73) Assignee: Eurocopter, Marignane Cedex (FR)

( * ) Notice: Subject to any disclaimer, the term of this patent is extended or adjusted under 35 U.S.C. 154(b) by 655 days.

(21) Appl. No.: 12/490,834

(22) Filed: Jun. 24, 2009

(65) Prior Publication Data

US 2009/0324407 A1    Dec. 31, 2009

(30) Foreign Application Priority Data

Jun. 27, 2008    (FR) ...................................... 08 03619

(51) Int. Cl.
*B64C 27/51*    (2006.01)
(52) U.S. Cl. ...................................... 416/106; 416/145
(58) Field of Classification Search .................. 416/106, 416/107, 105, 144, 145
See application file for complete search history.

(56) References Cited

U.S. PATENT DOCUMENTS

| | | | |
|---|---|---|---|
| 1,833,751 A | 11/1931 | Kimball | |
| 2,048,326 A | 7/1936 | Dyer et al. | |
| 4,915,585 A | 4/1990 | Guimbal | |
| 6,626,642 B1 * | 9/2003 | Veldkamp | 416/79 |

FOREIGN PATENT DOCUMENTS

| | | |
|---|---|---|
| DE | 102 02 995 | 8/2003 |
| EP | 0 792 414 | 11/2000 |
| EP | 1 101 034 | 6/2005 |
| FR | 791 701 | 12/1935 |
| FR | 2 497 073 | 7/1982 |
| FR | 2 630 703 | 11/1989 |
| WO | 00/06898 | 2/2000 |

OTHER PUBLICATIONS

French Search Report dated Mar. 11, 2009, from corresponding French application.

* cited by examiner

*Primary Examiner* — Dwayne J White

(74) *Attorney, Agent, or Firm* — Brooks Kushman P.C.

(57) ABSTRACT

Described is a blade (10) extending longitudinally from a root (11) of the blade (10) to a free end (12) of the blade (10), the blade (10) being provided with an incorporated resonator (20) for reducing the drag movements (F1, F2) of the blade (10), the resonator (20) being provided with a closed tank (30) that is partially filled with a liquid (50). Furthermore, the resonator (20) includes a central tube (40) immersed inside the tank (30), the tank (30) and the central tube (40) being arranged in a longitudinal direction (Y) of the blade (10), the central tube (40) having first and second ends (41, 42) that communicate with the tank (30) so that the liquid (50) can move from the tank (30) into the central tube (40), and vice versa.

12 Claims, 1 Drawing Sheet

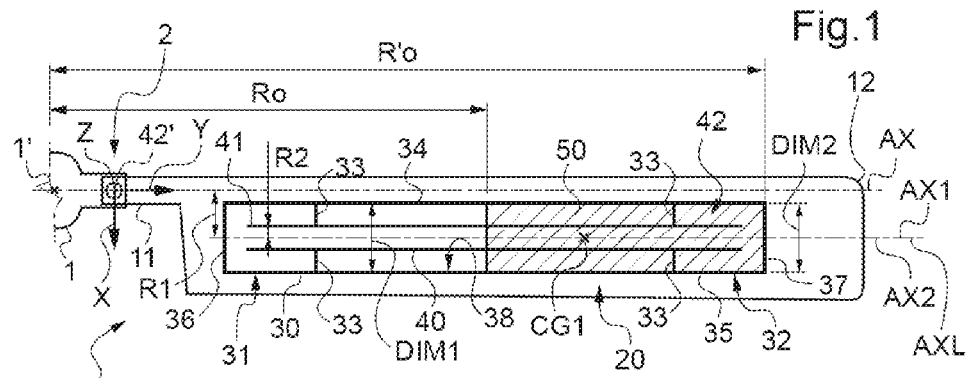
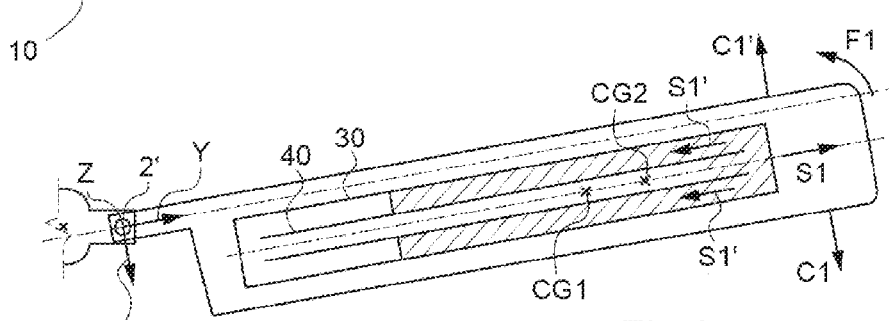
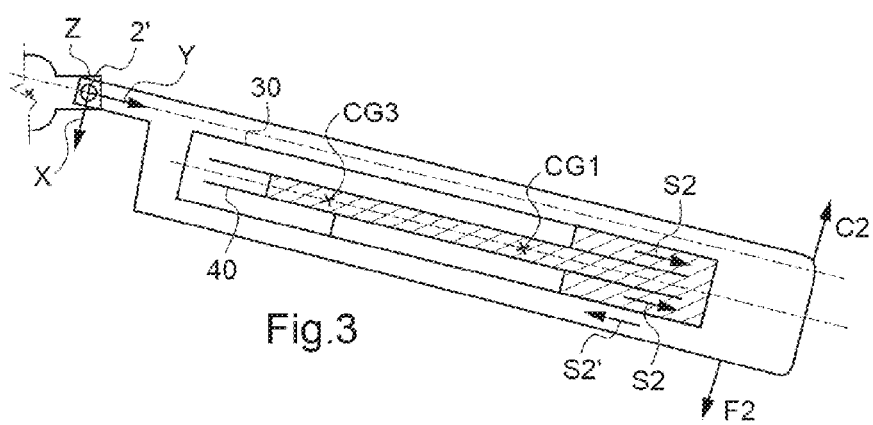

BLADE PROVIDED WITH A RESONATOR TO REDUCE THE DRAG MOVEMENTS OF SAID BLADE, AND A METHOD IMPLEMENTED BY SAID BLADE

FIELD OF THE INVENTION

The present invention relates to a blade provided with an incorporated resonator for reducing the drag movements of the blade, and it also relates to the method implemented by such a blade, more particularly a blade for a main lift and propulsion rotor of a rotorcraft, in particular a helicopter.

The technical field of the invention is that of means for damping drag movements of a blade.

BACKGROUND OF THE INVENTION

In general, rotorcraft rotors comprise a hub that is driven in rotation about an axis of rotation by an outlet shaft from a power transmission gearbox, referred to as the drive shaft, together with at least two blades that are fastened to the hub via suitable hinges, in particular via a respective laminated spherical thrust-bearing dedicated to each blade, together with inter-blade dampers, each interconnecting two adjacent blades, or dampers connecting each blade to the hub.

Assuming that each blade is engaged in a hub so as to be restrained in bending, the rotor constituted in this way is a rigid rotor. When hovering, the distribution of aerodynamic forces along a blade gives rise to a distribution of bending moments in flapping and in drag, which bending moments are of values that are very large at the root of the blade because of the increase in the circumferential speed proportional to the radius of the rotor.

Furthermore, when flying in translation, the so-called "advancing" blade generates more lift than the so-called "retreating" blade because of the difference in their air speeds, as described in greater detail below.

Consequently, the resultant of the aerodynamic forces exerted on a blade does not have the same value at each azimuth position, nor do the resultants have the same points of application: the restrained bending moment of the root of the blade is thus high and varying, thereby giving rise to alternating stresses that give rise to a fatigue phenomenon that is harmful to materials. In addition, the resultant of the aerodynamic forces of all of the blades is no longer directed along the axis of the rotor, thereby creating a roll moment, that increases with speed and that can make it difficult to balance forces when flying in translation.

In order to remedy those drawbacks, it is known to hinge the blades to the rotor about respective axes perpendicular to the drive shaft and referred to as axes for vertical flapping, corresponding to hinges for vertical flapping capable of transferring a force of arbitrary orientation but not capable under any circumstances of transferring a moment. Consequently, if a blade is hinged to flap relative to the hub, its bending moment in flapping at its point of attachment is zero. To enable the blade to be balanced, the centrifugal forces hold the blade in position after it has moved up a certain amount, thereby producing a cone of angle $a_0$.

Under such conditions, there is firstly no longer any major roll moment when flying in translation, and secondly the rotating blades no longer describe a plane, but rather their outer ends describe a very flat cone.

In practice, the flapping axis no longer lies on the axis of rotation, but is offset therefrom by a distance a, referred to as its eccentricity.

It should also be recalled that in order to provide a helicopter with lift in its various configurations, it is necessary to be able to control the lift of the rotor and to vary it. That is why a pitch hinge is provided, of axis that is substantially parallel to the span of the corresponding blade. This new degree of freedom enables the lift of the blade to be controlled by acting on the general pitch control, and also enables pitch to be varied cyclically, thereby enabling the plane of rotation of the blades to be controlled so that they describe a cone of geometrical axis that no longer coincides with the drive axis: the resultant of the forces applied to the hub changes direction together with the plane of the rotor. Because of this, moments are generated about the center of gravity of the helicopter, thereby enabling it to be piloted.

As mentioned above, the plane of rotation of the blades may be other than a plane perpendicular to the drive shaft. Under such conditions, it is necessary for each blade to be hinged to pivot in drag since the end of each blade is at a variable distance from the rotor shaft. Otherwise, inertia forces would necessarily appear, thereby generating reciprocating bending movements on each blade in its own plane. Such a drag hinge allows the blade to pivot about a drag axis that is substantially parallel to the rotor axis, and consequently substantially perpendicular to the drag forces. To enable such a blade to be driven by the drive shaft, it is naturally necessary for the drag hinge to be far enough away from the rotor axis for the moment due to centrifugal forces to balance the moment due to drag and inertia forces, thereby requiring the drag axis to be offset or eccentric by an amount e, and this must be achieved without the so-called "drag" angle δ being too great.

Consequently, the blades of a hinged rotor for a rotary wing aircraft, in particular a helicopter, can be subjected to the following four kinds of movement:

i) rotation about the rotor axis;

ii) pivoting about the axis for vertical flapping, made possible by the vertical flapping hinge;

iii) pivoting about the drag axis, also known as the axis for horizontal flapping, made possible by the horizontal flapping hinge or drag hinge; and iv) pivoting about the pitch axis of the blade, made possible by a pitch hinge (not specific to hinged rotors).

By way of example, provision is made in patent FR 2 497 073 for the three above-described pivoting movements II, III, and IV to be made possible by a single member such as a laminated spherical thrust-bearing.

Nevertheless, the oscillations of each blade about its drag axis can become coupled in unstable manner with the movements of the airframe or with its elastic deformation modes, in particular with oscillations of a helicopter that is standing on the ground on its landing gear: this is the origin of the so-called "ground resonance" phenomenon that can be dangerous for the rotorcraft when the resonant frequency of the oscillations of the blades about their drag axes and expressed relative to the frame of reference of the rotorcraft is close to one of the resonant frequencies of oscillation of the rotorcraft.

Document FR 791 701 discloses an inertial resonator carried by a rotor blade for damping or contributing to damping the vibration or the oscillation of said blade.

That inertial resonator comprises one or more heavy elements capable of performing transverse movements relative to the longitudinal axis of the blade.

Thereafter, a "box" is fastened to the rib of the blade. Since the rib of the blade extends along the longitudinal axis thereof, the box is arranged transversely to said rib.

At least one heavy element is then placed in the box, with the box acting as guide means therefor when it moves transversely.

According to that document FR 791 701, it is appropriate to move a heavy element transversely in order to solve the problem posed.

Document FR 791 701 explains that if the blade performs a drag movement, the weight moves in the direction opposite to the direction in which the blade moves, thereby contributing to damping the movement of the blade, the movement of the heavy element being retarded relative to the movement of the blade, because of its inertia.

Similarly, although the field of wind turbine blades is remote from the invention insofar as the phenomenon of ground resonance does not appear as such, documents DE 10 202 995 and EP 0 792 414 envisage inertial resonators making use of the transverse shifting of a heavy element in a direction perpendicular to a longitudinal direction of the blade, said longitudinal direction passing via the root of the blade and its end, and being substantially parallel to the axis for blade pitch variation, or indeed coinciding with said pitch variation axis.

Finally, on the same lines, document EP 1 101 034 provides for a wind turbine blade provided with an O-shaped cavity within which a liquid moves in the direction of oscillations, and thus transversely relative to the blade.

Although they are effective, those various resonators providing for a heavy element to move transversely provide damping that is limited, and therefore they do not give complete satisfaction.

Consequently, rotorcraft manufacturers generally make use of a different solution. Such manufacturers remedy the above-mentioned phenomenon of "ground resonance" by introducing on the drag axes damping by means of a resonator having a dry or viscous type damper, or indeed by introducing stiffness with the help of blade-spacing cables optionally associated with dampers, as for the Alouette helicopter made by the Applicant.

A function analogous to that of blade-spacing cables is provided by resilient inter-blade connections. In practice, this amounts to placing a damper between pairs of adjacent blades, the fastenings for such a damper to each of the two adjacent blades being at equal distance from the center of the rotor, i.e. on an identical radius from said rotor center.

Such inter-blade drag dampers include resilient return means of determined stiffness and damping for combating resonance phenomena, in particular ground resonance and also drive system resonance that can also appear, particularly on helicopters.

Patents FR 2 630 703 and U.S. Pat. No. 4,915,585 describe a rotor in which each blade is fastened to the hub by a sleeve having ends in the form of forks each comprising two spaced-apart and facing tines, with an inter-blade drag damper being fastened to two adjacent blades via two respective ball-joints.

Although effective, an arrangement of inter-blade drag dampers presents drawbacks.

Firstly, the weight of each inter-blade damper commonly lies in the range six to eleven kilograms, and that is not negligible.

Secondly, the movement of the blade in flight is forced to the frequency of the main rotor, so loads are imposed on the hub and on the portion of the blade or the sleeve serving to fasten the damper. These loads thus give rise to those various components being overdimensioned, and thus to an increase in the weight of the hub.

Finally, it should be observed that inter-blade dampers work most of the time in part under the effect of dynamic movements of the blades and they increase the aerodynamic drag of the rotor.

OBJECT AND SUMMARY OF THE INVENTION

A particular object of the present invention is to propose a lift blade, preferably for a rotorcraft, that is provided with a resonator that enables the drag movement of the blade to be damped so as to avoid the appearance of a "ground resonance" phenomenon, in particular.

According to the invention, a blade extending longitudinally from a root of the blade to a free end of the blade is provided with an incorporated resonator, i.e. a resonator incorporated inside the blade for reducing the drag movements of the blade, said resonator being provided with a closed tank that is partially filled with a liquid.

The blade, e.g. a rotorcraft blade, is remarkable in that the resonator comprises a central tube immersed inside the tank, the tank and the central tube being arranged in a longitudinal direction of the blade, the central tube having first and second ends in communication with the tank so that the liquid can move from the tank towards the central tube and vice versa, i.e. from the central tube towards the tank.

The longitudinal direction in which the tank and the central tube are arranged is substantially parallel to the pitch variation axis of the blade, or indeed coincides with said pitch variation axis. Consequently, the longitudinal direction extends in the span direction of the blade.

Contrary to existing prejudices, the invention seeks to use a heavy element, a liquid, in a blade in such a manner as to leave said heavy element free to move in a longitudinal direction of the blade as opposed to in a transverse direction perpendicular to the pitch variation axis of the blade.

Surprisingly, the resonator can then combat drag movements of the blade effectively when said blade is driven in rotation about an axis of rotation, with the resonator generating secondary Coriolis forces that are exerted on the blade.

When the blade is driven in rotation about an axis of rotation of a hub of a lift rotor of a rotorcraft, the drag of the blade varies about a mean position relative to the hub of the rotor under the effect of primary Coriolis forces.

When the blade is in its mean position, the liquid is in an equilibrium position inside the resonator, possibly filling the tank and the central tube in part.

However, when the blade begins a drag movement about its drag axis because of the primary Coriolis forces, the heavy element of the resonator represented by the liquid moves radially relative to the path described by the blade, and thus longitudinally relative to the blade.

More precisely, if the drag movement tends to advance the blade from its mean position, i.e. move the blade forwards relative to the direction of rotation of the rotor fitted with said blade, then the liquid moves longitudinally in the central tube towards the free end of the blade. Since the central tube communicates via its first and second ends with the tank, the liquid escapes from the central tube and thus fills the tank in which the central tube is arranged. Consequently, the liquid moves longitudinally in the tank, going towards the root of the blade.

This movement of the liquid tends to shift the center of gravity of the resonator towards the free end of the blade. The heavy element of the resonator, the liquid, thus tends to move away from the axis of rotation of the rotor hub so as to come closer to the free end of the blade. This results in secondary Coriolis forces being created that oppose the primary Coriolis forces, acting mainly in the direction of drag movement of the blade, and thus in a direction that is opposite to the direction of rotation of the rotor.

Thus, while the blade is advancing, i.e. while it is being subjected to an increase in its speed relative to the incident air flow, the blade moves upwards. As a result, all the elements of the blade move closer to the axis of rotation of the rotor and the circumferential speed of the blade on its trajectory should decrease. However, by the inertial effect, the primary Coriolis forces keep constant both the speed of the free end of the blade and the angular momentum of the blade. These primary Coriolis forces that give rise to the drag movement of the blade are due to the Coriolis acceleration that results from the relative upward speed of the blade associated with the angular speed of rotation with which the rotor is driven.

Each element of the blade is thus subjected to an increase of speed in the direction of rotation of the rotor, thereby increasing centrifugal force and moving the heavy element towards. The liquid then passes from the central tube towards the tank.

Since the tank has a section that is greater than that of the central tube around which it is located, the center of gravity of the resonator moves towards the free end of the blade, thereby tending to cause the blade to move downwards under the effect of gravity and simultaneously opposing the increase in the speed of any element of the blade. The drag movement is thus reduced in this direction of rotation.

More precisely, this downward relative speed of the blade associated with the angular speed of rotation with which the rotor is driven gives rise to secondary Coriolis forces opposing the primary Coriolis forces, thereby opposing the drag movement of the blade.

Consequently, in the absence of the invention, the blade would be subjected solely to primary Coriolis forces tending to drive it through a drag movement of large amplitude.

In contrast, the invention makes it possible to generate secondary Coriolis forces opposing said primary Coriolis forces, thereby making it possible to limit or even eliminate the drag movement of the blade.

Similarly, if the drag movement tends to retard the blade from its mean position, i.e. move the blade rearwards relative to the direction of rotation of the rotor, then the liquid heavy element moves longitudinally going from the tank towards the central tube. The center of gravity of the resonator tends to move towards the drag axis so as to come closer to the root of the blade. This results in secondary Coriolis forces being created that oppose the primary Coriolis forces, acting in the direction of rotation of the rotor.

In surprising and innovative manner, the resonator does not provide for a liquid heavy element to move towards the way of the drag movement of the blade, and independently of its direction thereof, but on the contrary to move along a longitudinally way, substantially perpendicular to said drag movement of the blade, such that the flapping and drag oscillations of the blade are reduced.

In addition, the invention may include one or more of the following additional characteristics.

For example, the tank includes fastener means, such as a plurality of ribs, for fastening the central tube to an inside wall of the tank.

The fastener means then guarantee that the central tube is properly arranged inside the tank.

Furthermore, the first and second ends of the central tube are possibly open, opening out into the inside of the tank.

The central tube may then be in the form of a cylinder with open bases that open out into the tank so as to allow the liquid of the resonator to move. The bases of the tube, situated at the first and second ends of the central tube, are then spaced apart from first and second end walls of the tank so that said end walls do not close off said first and second ends.

Advantageously, the tank presents symmetry of revolution about a first axis of symmetry. Similarly, the central tube may present symmetry of revolution about a second axis of symmetry.

For the tank and the central tube having respective first and second axes of symmetry, said first and second axes of symmetry may optionally coincide, and in particular coincide with a longitudinal axis of said blade extending in said longitudinal direction.

Furthermore, the tank is provided in succession, going from the root of the blade towards its free end, with first and second end zones having respective first and second dimensions in a transverse direction of the blade perpendicular to its longitudinal direction.

In a first embodiment, the first dimension is equal to the second dimension. In contrast, in a second embodiment the first dimension is advantageously greater than the second dimension.

Finally, the fluid possesses a maximum viscosity of 2000 centistokes, over a temperature range of $-40°$ C. to $+40°$ C., in order to optimize the operation of the resonator.

The present invention also provides a rotorcraft rotor provided with a hub suitable for performing rotary motion about an axis of rotation, at least one blade of the invention being fastened to the hub via a drag hinge.

When the resonator comprises a tank and a central tube, each presenting a symmetry of revolution, the tank having first and second end zones in succession going from the root of the blade towards its free end, the angular frequency of the resonator is determined by the following relationship:

$$\omega = \Omega \times \sqrt{\frac{R_0}{\left[1 + \left(\frac{R_1}{R_2}\right)^2\right] \times (R'_0 - R_0)}}$$

where:
  x represents the multiplication sign;
  $\omega$ represents the angular frequency of the blade resonator in radians per second;
  $\Omega$ represents the speed of rotation of the rotor;
  $R_0$ represents the spacing between said axis of rotation and the liquid when the blade is in a mean position;
  $R_1$ represents the first radius of the first end zone;
  $R_2$ represents the second radius of said central tube; and
  $R'_0$ represents the spacing between said axis of rotation from the face of the second end zone further away from the root of the blade.

This maximizes the effectiveness of the resonator.

The present invention also provides a method of limiting the drag movements of a blade as generated by primary Coriolis forces, the method being suitable for being implemented by a blade of the invention, in particular a blade of a rotor for providing a rotorcraft with lift and extending longitudinally from a root of the blade towards a free end of the blade.

In accordance with the invention, a liquid heavy element of a resonator incorporated in the blade is moved in a longitudinal direction of the blade so as to create secondary Coriolis forces opposing the drag movement of the blade.

Furthermore, for the resonator comprising a tank with a central tube immersed therein, said liquid is caused to pass at least in part from the tank towards the central tube or from the central tube towards the tank in order to create the secondary Coriolis forces opposing the drag movement of the blade, by shifting the center of gravity of the resonator.

BRIEF DESCRIPTION OF THE DRAWINGS

The invention and its advantages appear in greater detail from the description of embodiments given by way of illustration with reference to the accompanying figures, in which:

FIG. 1 is a description section view of a blade in a mean position and provided with a resonator constituting a first embodiment;

FIG. 2 is a diagrammatic section view of a blade in an advanced position provided with a resonator constituting a first embodiment;

FIG. 3 is a diagrammatic section view of a blade in a retarded position and provided with a resonator constituting a first embodiment; and FIG. 4 is a diagrammatic section of a blade in a mean position provided with a resonator constituting a second embodiment.

Elements shown in more than one of the figures are given the same references in each of them.

MORE DETAILED DESCRIPTION

It should be observed that three mutually orthogonal directions X, Y, and Z are shown in the figures. These three directions define the frame of reference of the blade shown.

The direction X is said to be "transverse" insofar as it extends perpendicularly to the pitch variation axis AX of the blade 10. The term "transverse" relates to a direction that is parallel thereto.

Another direction Y is said to be longitudinal. The term "longitudinal" relates to a direction that is parallel thereto.

Finally, a third direction Z referred to as elevation corresponds to the height dimensions of the structures described.

FIG. 1 is a diagrammatic section view of a blade 10 in its mean position and provided with a resonator constituting a first embodiment.

The blade 10 is fixed to the hub 1 of a rotorcraft rotor by a drag hinge 2, the root 11 of the blade being connected to the drag hinge 2 by the usual means.

When the rotorcraft rotor is set into rotation, the blade 10 rotates about the axis of rotation 1' of the rotor.

Furthermore, the blade 10 rotates about the drag axis 2' moving forwards or backwards relative to the mean position. This drag movement of the blade 10 can then give rise to situations that are catastrophic when the resonant frequency of the oscillations of each blade about its respective drag axis and expressed in the frame of reference of the rotorcraft is close to one of the resonant frequencies of oscillation of the rotorcraft, in particular when standing on its landing gear.

To solve this problem, the blade 10 is fitted with a resonator 20 incorporated inside the blade 10 in order to reduce the amplitude of drag oscillations that unbalance the rotor and that generate high levels of vibration that are liable to be coupled with the oscillations of the rotorcraft when standing on its landing gear. It can then be appropriate to provide a hatch in the suction side of the blade 10 in order to have access to the resonator, e.g. for the purpose of performing maintenance actions.

The resonator 20 comprises a closed tank 30 provided with a front surface 34, a rear surface 35, a first end wall 36, and a second end wall 37, respectively facing the leading edge, the trailing edge, the root 11, and the free end 12 of the blade 10.

The tank 30 comprises successively from the root 11 of the blade going towards its free end: a first end zone 31 and then a second end zone 32, the first end wall 36 being in the first end zone 31, while the second end wall is situated in the second end zone 32.

Furthermore, the closed tank 30 presents symmetry of revolution about a first axis of symmetry AX1.

The tank 30 is also arranged longitudinally in the blade 10, i.e. along the longitudinal direction Y, or indeed along the pitch variation axis AX of the blade 10.

More precisely, the tank 30 is arranged along a longitudinal axis AXL of the blade 10 that is parallel to the longitudinal direction Y, and thus parallel to the pitch variation axis AX. It should be observed that the first axis of symmetry of the tank 30 coincides with the longitudinal axis AXL.

In addition to the tank 30, the resonator 20 also includes a central tube 40 immersed inside the tank 30.

The central tube 40 is in the form of a cylinder and thus presents symmetry of revolution about a second axis of symmetry AX2.

Like the tank 30, the central tube 40 extends in the longitudinal direction Y of the blade 10, the second axis of symmetry AX2 coinciding with the first axis of symmetry AX1 and the longitudinal axis AXL.

Furthermore, the central tube 40 communicates with the tank 30 via its first and second ends 41 and 42. Thus, the first and second ends 41 and 42 of the central tube are open and open out into the tank 30, respectively in the first and second end zones 31 and 32 of the tank 30.

Since the central tube is a cylinder in the example shown in FIG. 1, the first and second ends of the central tube 40 constitute the hollow bases of said cylinder.

It will be understood that the central tube 40 needs to be positioned with care so that the first and second ends are spaced apart from the first and second end walls 36 and 37 of the tank 40. In order to be able to open out into the inside of the tank, the first and second ends of the central tube must not be closed by the tank, and in particular by its first and second end walls 36 and 37.

In order to position the central tube 40 correctly inside the tank 30, the resonator is provided with fastener means comprising a plurality of ribs 33. The central tube is thus fastened to an inside surface 38 of the tank 30 via the ribs 33 of the fastener means.

The resonator is then partially filled with a liquid 50. Since the central tube opens out into the tank, the liquid can flow from the central tube 40 into the tank 30, or from the tank 30 into the central tube 40 under the effect of inertia forces.

With reference to FIG. 1, when the rotor is set into rotation at a speed Ω by means of an engine, the liquid 50 is thrust by the action of centrifugal force against the second end wall 37 of the tank 30, i.e. the end wall of the tank and of the resonator that is furthest from the axis of rotation of the rotor.

It should be observed that the liquid is at a first distance $R_O$ from the axis of rotation 1' of the rotor. This first distance is necessarily shorter than a second distance $R'_O$ between the second end wall 37 and the axis of rotation 1', the second end wall representing the face 37 of the second end zone 31 that is furthest from the root of the blade.

With reference to FIG. 2, if the blade 10 moves away from its mean position by pivoting about its drag axis 2' in the direction of arrow F1 under the effect of primary Coriolis forces C1', the first volume of liquid 50 contained in the central tube 40 moves longitudinally towards the free end 12 of the blade, as shown by arrow S1, because of the effect of the above-explained inertia forces.

Consequently, this movement increases the second volume of liquid 50 contained in the tank 30, which moves longitudinally along the arrow S1'.

The increase in the second volume of liquid 50 to the detriment of the first volume of liquid 50 causes the center of gravity of the resonator 20 to be shifted from an equilibrium position CG1 to an outer position CG2.

Implementing the method thus causes a heavy element, i.e. the liquid 50, to be shifted along the longitudinal direction Y. This shift gives rise to the center of gravity of the resonator moving in translation along the longitudinal axis AXL, which longitudinal axis also represents the first and second axes of symmetry AX1 and AX2 of the tank 30 and of the central tube 40.

This movement in translation of the center of gravity then gives rise to secondary Coriolis forces C1 being created that oppose the drag movement of the blade 10, thereby limiting the amplitude thereof. These secondary Coriolis forces result from the combined effects of the angular speed of rotation driving the rotor and the relative downward speed of the blade due to gravity by virtue of the blade pivoting about its flapping axis.

Conversely, with reference to FIG. 3, if the blade 10 performs a drag movement from its mean position in a rearward direction about its drag axis 2, as shown by arrow F2, and thus in the direction opposite to the direction of rotation of the blade 10 about its axis of rotation 1', the first volume of liquid 50 is shifted longitudinally towards the root of the blade as shown by arrow S2'.

Consequently, a fraction of the liquid 50 of the central volume penetrates into the central tube 40 as a result of suction and therefore increases the first volume, with the liquid shifting longitudinally along the central tube 40 as shown by arrow S2'.

The increase in the first volume of liquid to the detriment of the second volume of liquid causes the center of gravity of the resonator to shift from an equilibrium position CG1 to an inner position CG3, and consequently generates secondary Coriolis forces C2. These secondary Coriolis forces C2 oppose the rearward drag movement of the blade 10.

Thus, the liquid contained in the resonator shifts continuously along the longitudinal direction Y. The same applies to the center of gravity of the resonator that oscillates about its equilibrium position CG1, between an inner position CG3 and an outer position CG2.

Advantageously, the first end zone 31 of the tank 30 is cylindrical in shape with a first radius $R_1$, the central tube 40 is cylindrical in shape with a second radius $R_2$, and the angular frequency $\omega$ of the resonator is determined using the following relationship:

$$\omega = \Omega \times \sqrt{\frac{R_0}{\left[1+\left(\frac{R_1}{R_2}\right)^2\right] \times (R'_0 - R_0)}}$$

In the first embodiment shown in FIGS. 1 to 3, the first and second end zones 31 and 32 of the tank 30 have respective first and second dimensions DIM1 and DIM2 in a transverse direction of said blade perpendicularly to said longitudinal direction, and the first and second dimensions DIM1 and DIM2 are equal.

In contrast, in a second embodiment, the first dimension DIM1 is greater than the second dimension DIM2, or the second dimension DIM2 is greater than the first dimension DIM1. This embodiment enables the equilibrium position of the center of gravity to be adjusted accurately.

With reference to FIG. 4, the first dimension DIM1 is greater than the second dimension DIM2.

Naturally, the present invention can be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A blade (10) extending longitudinally from a root (11) of the blade (10) to a free end (12) of said blade (10), the blade (10) being provided with an incorporated resonator (20) for reducing the drag movements (F1, F2) of said blade (10), said resonator (20) being provided with a closed tank (30) that is partially filled with a liquid (50), wherein said resonator (20) includes a central tube (40) immersed inside said tank (30), the tank (30) and the central tube (40) being arranged in a longitudinal direction (Y) of the blade (10), said central tube (40) having first and second ends (41, 42) that communicate with said tank (30) so that said liquid (50) can move from the tank (30) into the central tube (40), and vice versa.

2. A blade according to claim 1, wherein said tank (30) includes fastener means (33) for fastening said central tube (40) to an inside wall (38) of said tank (30).

3. A blade according to claim 1, wherein said first and second ends (41, 42) of the central tube (40) are open and open out into the inside of said tank (30).

4. A blade according to claim 1, wherein said tank (30) presents symmetry of revolution about a first axis of symmetry (AX1).

5. A blade according to claim 1, wherein said central tube (40) presents symmetry of revolution about a second axis of symmetry (AX2).

6. A blade according to claim 4, wherein said tank (30) and said central tube (40) have respective first and second axes of symmetry (AX1, AX2), and said first and second axes of symmetry (AX1, AX2) coincide.

7. A blade according to claim 6, wherein said first and second axes of symmetry (AX1, AX2) coincide with a longitudinal axis (AXL) of said blade extending along said longitudinal direction (Y).

8. A blade according to claim 1, wherein said tank (30) is provided in succession going from the root (11) of the blade (10) towards its free end (12) with first and second end zones (31, 32) having respective first and second dimensions (DIM1, DIM2) in a transverse direction (X) of said blade (10) perpendicularly to said longitudinal direction (Y), said first dimension (DIM1) being greater than the second dimension (DIM2).

9. A blade according to claim 1, wherein said fluid possesses a maximum viscosity of 2000 centistokes.

10. A rotorcraft rotor provided with a hub (1) suitable for rotating about an axis of rotation (1'), at least one blade (10) being fastened to said hub (1) via a drag hinge (2), wherein said blade (10) is a blade according to claim 1 that is provided with a resonator (20) comprising a tank (30) and a central tube (40), each presenting symmetry of revolution, said tank (30) being provided with first and second end zones (41, 42) in succession going from the root (11) of the blade (10) towards its free end (12), the angular frequency ($\omega$) of said resonator (20) being determined by the following relationship:

$$\omega = \Omega \times \sqrt{\frac{R_0}{\left[1 + \left(\frac{R_1}{R_2}\right)^2\right] \times (R'_0 - R_0)}}$$

where:

× represents the multiplication sign;

ω represents the angular frequency of the blade resonator in radians per second;

Ω represents the speed of rotation of the rotor;

$R_0$ represents the spacing between said axis of rotation and the liquid when the blade is in a mean position;

$R_1$ represents the first radius of the first end zone;

$R_2$ represents the second radius of said central tube; and $R'_0$ represents the spacing between said axis of rotation from a face of the second end zone further away from the root of the blade.

11. A method for limiting the drag movements (F1, F2) of a blade (10) extending longitudinally from a root (11) of the blade (10) to a free end (12) of the blade (10), wherein said resonator (20) comprises a tank (30) having a central tube (40) immersed therein, and a liquid element (50) of a resonator (20) incorporated in the blade (10) is shifted in a longitudinal direction (Y) of said blade (10) so as to create secondary Coriolis forces (C1, C2) opposing the drag movement (F1, F2) of the blade (10) by causing at least some of said liquid (50) to pass from the tank (30) towards the central tube (40) or from the central tube (40) towards the tank.

12. A method according to claim 11, wherein the method is performed by a blade (10) extending longitudinally from a root (11) of the blade (10) to a free end (12) of said blade (10), the blade (10) being provided with an incorporated resonator (20) for reducing the drag movements (F1, F2) of said blade (10), said resonator (20) being provided with a closed tank (30) that is partially filled with a liquid (50), wherein said resonator (20) includes a central tube (40) immersed inside said tank (30), the tank (30) and the central tube (40) being arranged in a longitudinal direction (Y) of the blade (10), said central tube (40) having first and second ends (41, 42) that communicate with said tank (30) so that said liquid (50) can move from the tank (30) into the central tube (40), and vice versa.

* * * * *